United States Patent [19]

Takanashi et al.

[11] Patent Number: 5,250,939

[45] Date of Patent: Oct. 5, 1993

[54] DRIVE APPARATUS FOR OPTICAL ELEMENT ARRAY

[75] Inventors: Itsuo Takanashi, Kamakura; Shintaro Nakagaki, Miura; Ichiro Negishi; Tetsuji Suzuki, both of Yokosuka; Fujiko Tatsumi, Yokohama; Ryusaku Takahashi; Keiichi Maeno, both of Yokosuka; Tsuyoshi Yoshimura, Tokyo, all of Japan

[73] Assignee: Victor Company of Japan, Ltd., Japan

[21] Appl. No.: 787,867

[22] Filed: Nov. 5, 1991

[30] Foreign Application Priority Data

Nov. 30, 1990 [JP] Japan ................................ 2-336122
May 31, 1991 [JP] Japan ................................ 3-155266

[51] Int. Cl.$^5$ ............................................. G09G 3/00
[52] U.S. Cl. ..................................... 345/204; 345/82; 345/46
[58] Field of Search ............... 340/789, 782, 811, 762, 340/784, 765, 767, 793; 315/169.3, 167; 313/498

[56] References Cited

U.S. PATENT DOCUMENTS 4,689,618  8/1987  Hikichi ................. 340/762
4,897,639  1/1990  Kanayama ............. 340/782
5,075,676 12/1991  Ando ..................... 340/765

FOREIGN PATENT DOCUMENTS 24547  1/1990  Japan .

Primary Examiner—Ulysses Weldon
Assistant Examiner—Doon Yue Chow
Attorney, Agent, or Firm—Lowe, Price, LeBlanc & Becker

[57] ABSTRACT

A drive apparatus for an optical element array includes a counter counting clock pulses and being periodically reset at a horizontal scanning period. The counter outputs first and second counter signals out of phase with each other. A latch holds a pixel-corresponding segment of an input image signal. One of clock signals out of phase with each other is selected in response to the pixel-corresponding input-signal segment held by the latch. A first comparator compares the first counter signal and the pixel-corresponding input-signal segment held by the latch, and outputs a first identity signal when the first counter signal and the pixel-corresponding input-signal segment are equal to each other. A second comparator compares the second counter signal and the pixel-corresponding input-signal segment held by the latch, and outputs a second identity signal when the second counter signal and the pixel-corresponding input-signal segment are equal to each other. A drive pulse is generated which starts in synchronism with a start of a horizontal scanning period and which ends in response to the selected clock signal and in response to the first and second identity signals. An optical element in the array is driven in response to the drive pulse.

2 Claims, 9 Drawing Sheets

DRIVE APPARATUS FOR OPTICAL ELEMENT ARRAY

BACKGROUND OF THE INVENTION

This invention relates to a drive apparatus for an optical element array.

An array of LEDs (light-emitting diodes) is used in various systems such as an image recording system based on electrophotography. In general, the characteristics of respective LEDs are different from each other, and the quantity of emitted light varies from LED to LED.

Japanese published unexamined patent application 2-4547 discloses a drive apparatus for an optical element array which compensates for such variations in the characteristics of LEDs. As will be explained later, the drive apparatus of Japanese application 2-4547 has some problem.

SUMMARY OF THE INVENTION

It is an object of this invention to provide an improved drive apparatus for an optical element array.

A first aspect of this invention provides a drive apparatus for an optical element array which comprises a counter counting clock pulses and being periodically reset at a horizontal scanning period, the counter outputting first and second counter signals out of phase with each other; means for latching a pixel-corresponding segment of an input image signal; means for selecting one of clock signals out of phase with each other in response to the pixel-corresponding input-signal segment latched by the latching means; a first comparator comparing the first counter signal and the pixel-corresponding input-signal segment latched by the latching means, and outputting a first identity signal when the first counter signal and the pixel-corresponding input-signal segment are equal to each other; a second comparator comparing the second counter signal and the pixel-corresponding input-signal segment latched by the latching means, and outputting a second identity signal when the second counter signal and the pixel-corresponding input-signal segment are equal to each other; means for generating a pulse which starts in synchronism with a start of a horizontal scanning period and which ends in response to the clock signal selected by the clock selecting means and in response to the first and second identity signals; and means for driving an optical element in the array in response to the pulse generated by the pulse generating means.

A second aspect of this invention provides a drive apparatus for an optical element array which comprises a counter counting clock pulses and being periodically reset at a horizontal scanning period, the counter outputting first and second counter signals out of phase with each other; means for latching a pixel-corresponding segment of an input image signal; first selecting means for selecting one of clock signals out of phase with each other in response to predetermined lower bits of the pixel-corresponding input-signal segment latched by the latching means; a first comparator comparing the first counter signal and predetermined higher bits of the pixel-corresponding input-signal segment latched by the latching means, and outputting a first identity signal when the first counter signal and the higher bits of the pixel-corresponding input-signal segment are equal to each other; a second comparator comparing the second counter signal and the higher bits of the pixel-corresponding input-signal segment latched by the latching means, and outputting a second identity signal when the second counter signal and the higher bits of the pixel-corresponding input-signal segment are equal to each other; second selecting means for selecting one of the first and second identity signals in response to a highest bit of the lower bits of the pixel-corresponding input-signal segment; means for generating a pulse which starts in synchronism with a start of a horizontal scanning period and which ends in response to the clock signal selected by the first selecting means and in response to the identity signal selected by the second selecting means; and means for driving an optical element in the array in response to the pulse generated by the pulse generating means.

BRIEF DESCRIPTION OF THE DRAWINGS

FIGS. 4(a)–4(f) are a timing diagram showing the waveforms of various signals in the drive apparatus of FIG. 3.

DESCRIPTION OF THE PRIOR ART

Figure 1:
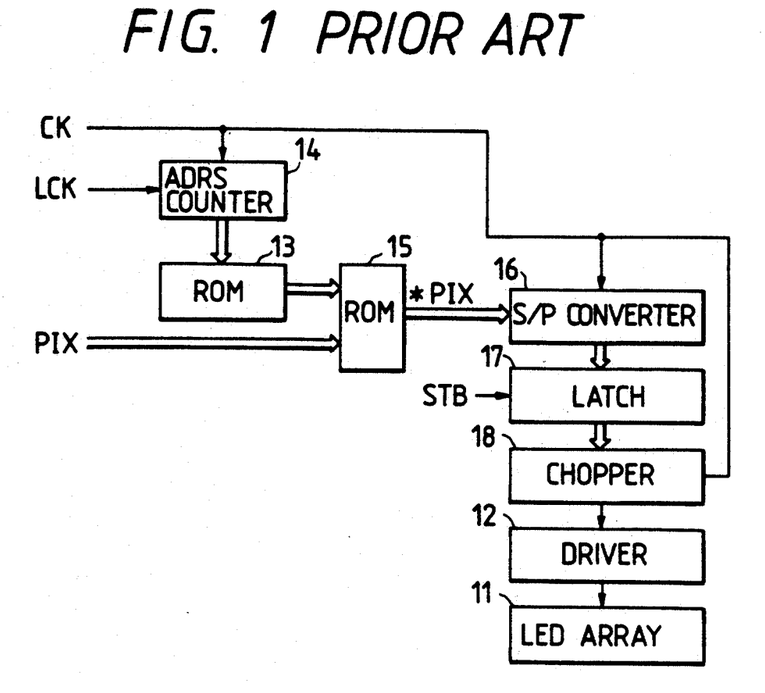
FIG. 1 is a block diagram of a prior art drive apparatus for an optical element array.

With reference to FIG. 1, a prior art apparatus functions to drive a linear array 11 of LEDs. The linear array 11 of the LEDs corresponds to one horizontal line, and the LEDs correspond to pixels respectively. The prior art apparatus of FIG. 1 includes a driver 12, a corrective ROM (read-only memory) 13, an address counter 14, a conversion ROM 15, a serial-to-parallel (S/P) converter 16, a latch 17, and a chopper generator 18.

A digital image signal PIX is inputted sequentially pixel by pixel, with plural bits representative of each pixel being in parallel. The image signal PIX has "n" bits per pixel. A clock signal CK is synchronized with each bit of the image signal PIX. A line clock signal LCK is synchronized with each shift of the image signal PIX which corresponds to one horizontal line.

The driver 12 serves to drive the LEDs of the array 11. The corrective ROM 13 stores data for correcting variations between quantities of emitted light from the respective LEDs. The corrective data have N bits per LED. The address counter 14 generates an address in response to the clock signal CK and the line clock signal LCK, the address being fed to the corrective ROM 13 and being used in reading out the corrective data from the corrective ROM 13. The corrective data corresponding to each pixel of the image signal PIX are read out from the corrective ROM 13 in response to the address. The corrective data have N bits per pixel.

The conversion ROM 15 receives the N-bit corrective signal from the corrective ROM 13. The conversion ROM 15 also receives the n-bit image signal PIX. The conversion ROM 15 generates a Q-bit corrected image signal *PIX which agrees with a multiplication or product of the N-bit corrective signal and the n-bit image signal PIX. The S/P converter 16 receives the Q-bit corrected signal *PIX from the conversion ROM 15, and stores a 1-line quantity of the Q-bit corrected signal *PIX. Each time storing a 1-line quantity of the Q-bit corrected signal *PIX into the S/P converter 16 is completed, the S/P converter 16 outputs the 1-line quantity of the corrected signal in parallel. The latch 17 receives the 1-line corrected signal from the S/P converter 16, and takes in the 1-line corrected signal at a timing determined by a strobe signal STB generally having a horizontal scanning period. The latch 17 continues to hold the 1-line corrected signal until processing or recording of the corresponding line is completed.

The chopper generator 18 receives the 1-line corrected signal from the latch 17. The chopper generator 18 includes sections corresponding to the LEDs in the array 11 respectively and generates chopper signals in response to the 1-line corrected signal. The generated chopper signals correspond to the LEDs in the array 11 respectively. During a 1-line scanning period, the chopper signals are sequentially outputted from the chopper generator 18 to the driver 12 in synchronism with the clock signal CK. The chopper signals are binary, having duty cycles depending on the corrected data from the latch 17. The driver 12 drives the LEDs in response to the chopper signals respectively in a time-division manner. Specifically, the driver 12 feeds drive currents to the LEDs during the high-level periods of the chopper signals respectively.

In the prior art apparatus of FIG. 1, the intervals of light emission from the LEDs, that is, the intervals of current feed to the LEDs, are controlled in accordance with the corrective data so as to compensate for differences between the light-emission characteristics of the LEDs. Furthermore, the intervals of light emission from the LEDs are controlled in response to the input image signal PIX.

Figure 2:
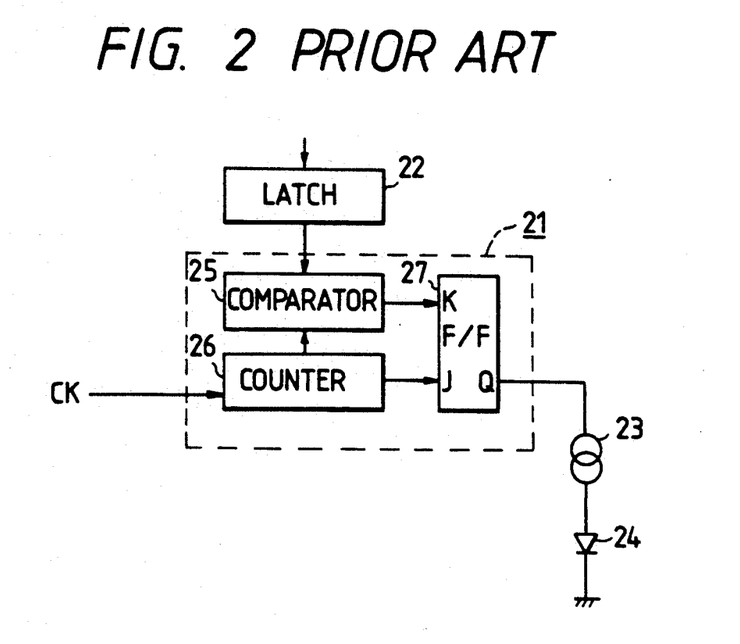
FIG. 2 is a block diagram of a part of the prior art drive apparatus of FIG. 1.

As described previously, the chopper generator 18 has sections corresponding to the LEDs in the array 11 respectively. In addition, the latch 17 has sections corresponding to the LEDs in the array 11 respectively. As shown in FIG. 2, a section 22 of the latch 17 is followed by a section 21 of the chopper generator 18. The section 21 of the chopper generator 18 is connected in series with a section 23 of the driver 12 and an LED 24 in the array 11.

The section 21 of the chopper generator includes a comparator 25, a counter 26, and a JK flip-flop 27. The counter 26 counts pulses of the clock signal CK, and is periodically reset at a predetermined period. The comparator 25 compares the output image data from the section 22 of the latch and the output signal from the counter 26, and outputs an identity signal when the image data and the counter signal are equal to each other. The JK flip-flop 27 outputs a pulse which starts at a fixed timing and which ends in response to the identity signal outputted from the comparator 25. Thus, the width of the output pulse from the JK flip-flop 27 depends on the image data. The section 23 of the driver drives the LED 24 in response to the output pulse from the JK flip-flop 27.

In the prior art drive apparatus of FIGS. 1 and 2, the counters in the respective sections 21 of the chopper generator 18 respond to a common clock signal CK. Therefore, when higher-speed data processing is required, it is necessary to increase the frequency of the clock signal CK and to use circuit elements which can reliably operate at high speeds.

DESCRIPTION OF THE FIRST PREFERRED EMBODIMENT

Figure 3:
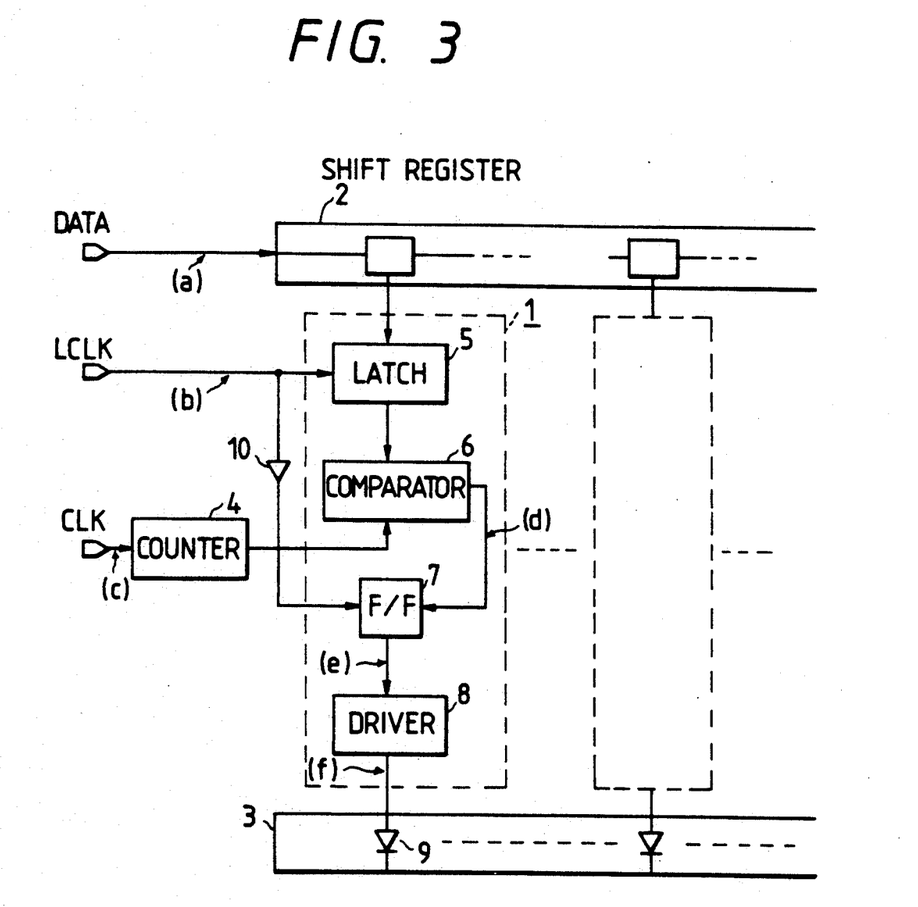
FIG. 3 is a block diagram of a drive apparatus for an optical element array according to a first embodiment of this invention.

With reference to FIG. 3, a drive apparatus for an optical element array includes processing units 1, a shift register 2 connected to the processing units 1, a counter 4 connected to the processing units 1, and a delay circuit 10 connected to the processing units 1. The processing units I have similar structures, and are connected to LEDs 9 in a linear array 3 respectively. Thus, the processing units I correspond to the LEDs 9 respectively. The linear array 3 of the LEDs 9 corresponds to one horizontal line, and the LEDs 9 correspond to pixels respectively. Each processing unit 1 includes a latch 5, a comparator 6, a flip-flop 7, and a driver 8.

A digital image signal DATA is inputted sequentially pixel by pixel. The image signal DATA has "n" bits per pixel, which are inputted in parallel. In general, the image signal DATA agrees with the result of correcting an original image signal to compensate for variations among the characteristics of the LEDs 9 in the array 3. The corrected image signal DATA is generated as in the prior art apparatus of FIGS. 1 and 2. A reference clock signal CLK is synchronized with each bit of the image signal DATA. A reference line clock signal LCLK has a period corresponding to a period of 1-line drive, and is thus synchronized with each 1-line drive.

The image signal DATA is fed to the shift register 2, and is stored into the shift register 2. The shift register 2 includes a series combination of storage sections corresponding to pixels respectively. The shift register 2 has a capacity corresponding to the product of the number of pixels and the bit number "n" of the image signal DATA, that is, a capacity for storing a 1-line quantity of the image signal DATA.

Pixel-corresponding time segments of the image signal DATA are sequentially inputted into the shift register 2, being sequentially shifted from storage sections to subsequent storage sections in the shift register 2. The storage sections of the shift register 2 are connected to the latches 5 of the processing units 1 respectively. Each time storing a 1-line quantity of the image signal DATA is completed, the latches 5 of the processing units 1 take in the pixel-corresponding output image data from the storage sections of the shift register 2 respectively in response to the line clock signal LCLK. In each processing unit 1, during a next line drive period, the pixel-corresponding image data are fed from the latch 5 to the comparator 6. The latch 5 and the comparator 6 have capacities corresponding to n-bit signal quantities.

The counter 4 counts pulses of the clock signal CLK, and outputs a signal representing the number of the counted pulses. The counter 4 is periodically reset at a period corresponding to a horizontal scanning period (a 1-line period). The output signal from the counter 4 is fed to the comparators 6 of the processing units 1. In each processing unit 1, the comparator 6 compares the output signal from the latch 5 and the output signal from the counter 4, and outputs an identity pulse to the flip-flop 7 when the output signal from the latch 5 and the output signal from the counter 4 become equal. Thus, the moment of the occurrence of an identity pulse depends on the image data fed from the latch 5.

The delay circuit 10 delays the line clock signal LCLK by a predetermined short time. The output signal from the delay circuit 10 is fed to the flip-flops 7 of the processing units 1.

In each processing unit 1, the flip-flop 7 is set by a pulse of the output signal from the delay circuit 10 and is reset by an identity pulse from the comparator 7 so that the flip-flop 7 outputs a pulse having a duration which equals to the interval between the moment of the occurrence of the pulse of the output signal from the delay circuit 10 and the moment of the occurrence of the identity pulse from the comparator 7. Thus, the duration of the output pulse from the flip-flop 7 depends on the image data. The driver 8 receives the output pulse from the flip-flop 7, and generates a drive pulse current on the basis of the output pulse from the flip-flop 7. The drive pulse current is fed from the driver 8 to the corresponding LED 9 so as to activate the LED 9. In this way, the LED 9 is driven by a drive pulse current having a duration which depends on the duration of an output pulse from the flip-flop 7, that is, which depends on the image data.

Figures 4A, 4B, 4C:
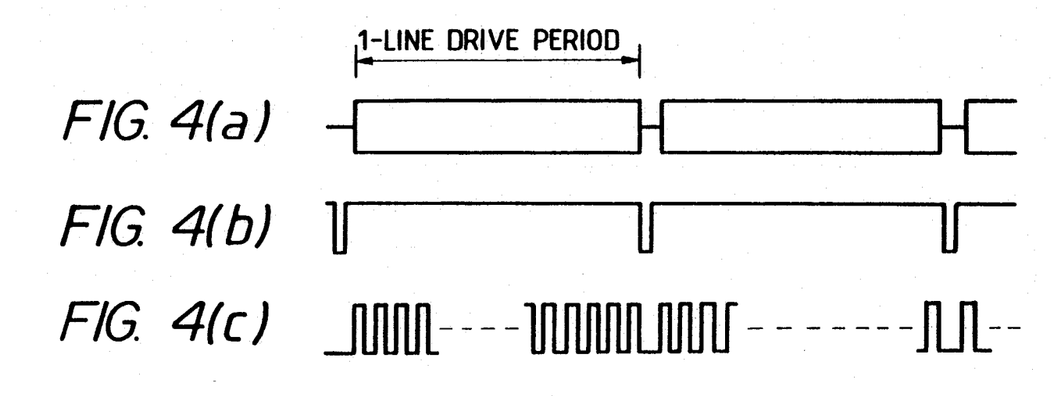
Figure 4D:
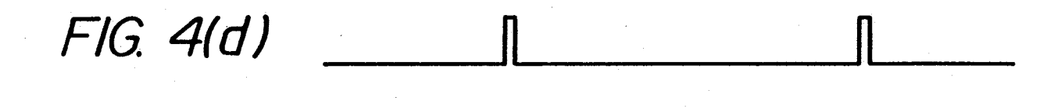
Figures 4E, 4F:
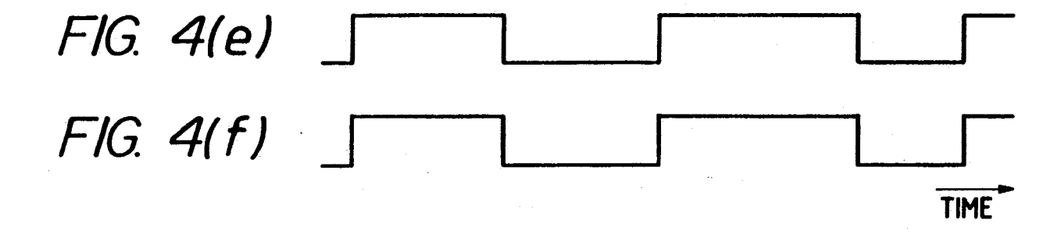

The operation of the drive apparatus of FIG. 3 will be further described with reference to FIG. 4. The parts (a)-(f) of FIG. 4 show the waveforms of the signals denoted by the characters (a)-(f) in FIG. 3 respectively.

As shown in the parts (a) and (b) of FIG. 4, the line clock signal LCLK or the signal (b) has a train of negative pulses. The leading edge, that is, the falling edge, of a pulse of the line clock signal LCLK occurs when a 1-line drive period of the image signal DATA or the signal (a) ends. The trailing edge, that is, the rising edge, of a pulse of the line clock signal LCLK occurs immediately before a next 1-line drive period of the image signal DATA or the signal (a) starts. The line clock signal LCLK is delayed by the delay circuit 10 by the predetermined short time. The output signal from the delay circuit 10 is fed to the flip-flop 7.

As shown in the part (c) of FIG. 4, the clock signal CLK has a train of pulses. The counter 4 counts pulses of the clock signal CLK, and outputs a signal representing the number of the counted pulses. The counter 4 is periodically reset at a predetermined period corresponding to a 1-line period. The output signal from the counter 4 is fed to the comparator 6. The comparator 6 compares the output signal from the latch 5 and the output signal from the counter 4, and outputs an identity pulse (d) to the flip-flop 7 when the output signal from the latch 5 and the output signal from the counter 4 become equal.

The flip-flop 7 is set by a pulse of the output signal from the delay circuit 10 and is reset by an identity pulse from the comparator 6. Thus, as shown in the part (e) of FIG. 4, the flip-flop 7 outputs a pulse having a duration which equals to the interval between the moment of the occurrence of the pulse of the output signal from the delay circuit 10 and the moment of the occurrence of the output identity pulse from the comparator 7. The driver 8 receives the output pulse from the flip-flop 7, and generates a drive pulse current (f) on the basis of the output pulse from the flip-flop 7. As shown in the parts (e) and (f) of FIG. 4, the output pulse from the flip-flop 7 and the drive pulse current from the driver 8 have equal timing characteristics. The drive pulse current is fed from the driver 8 to the corresponding LED 9 so as to activate the LED 9. In this way, the LED 9 is driven by a drive pulse current having a duration which depends on the duration of an output pulse from the flip-flop 7.

DESCRIPTION OF THE SECOND PREFERRED EMBODIMENT

Figure 5:
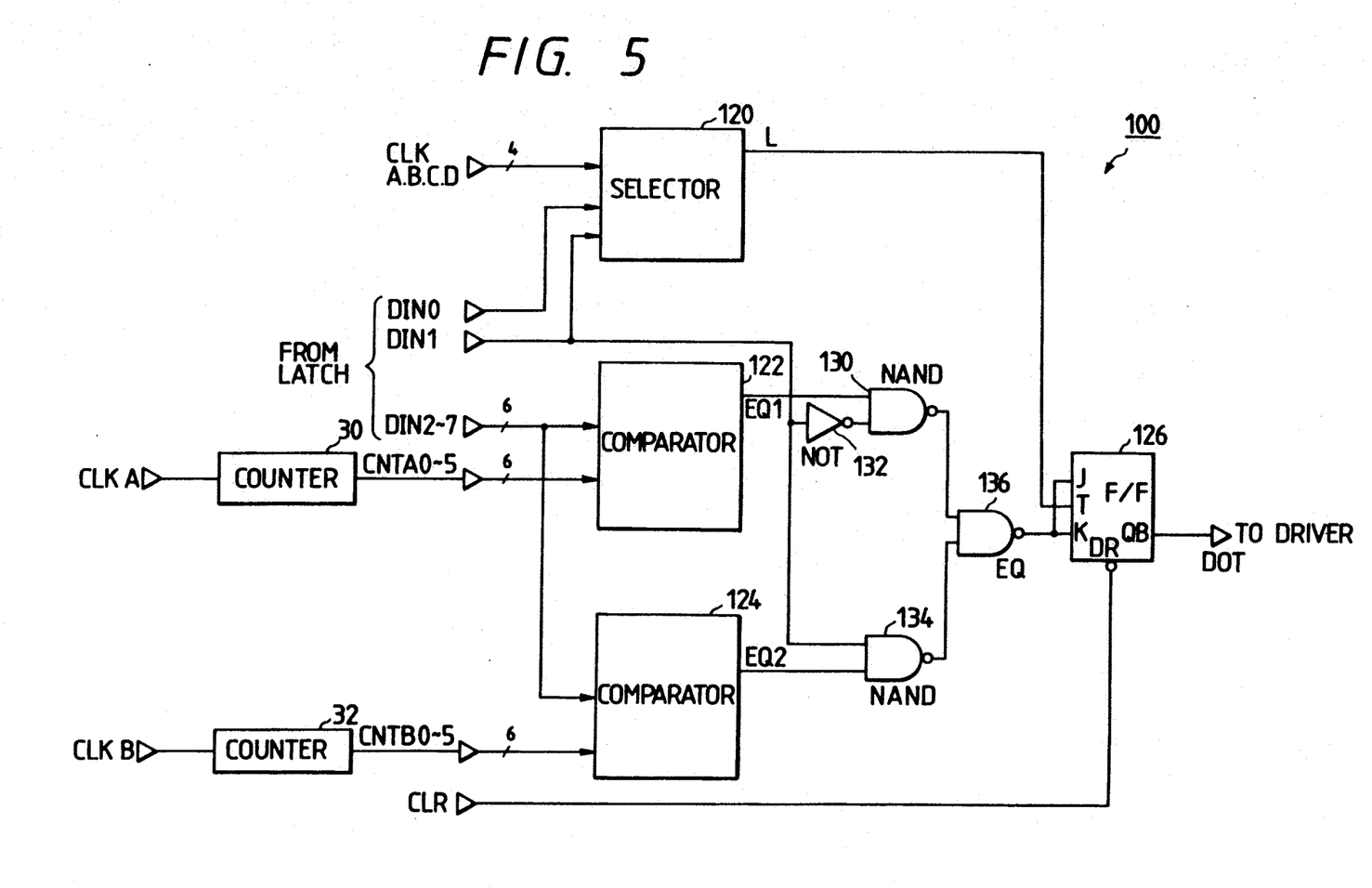
FIG. 5 is a block diagram of an essential part of a drive apparatus for an optical element array according to a second embodiment of this invention.

FIG. 5 shows an essential part of a second embodiment of this invention which is similar to the embodiment of FIGS. 3 and 4 except for the following design changes. The second embodiment includes a pulse width modulator 100 which replaces the combination of a comparator 6 and a flip-flop 7 in each processing unit 1. In addition, a first counter 30 and a second counter 32 are provided other than each processing unit 1 and used in common for the respective processing units 1.

Figure 9A:
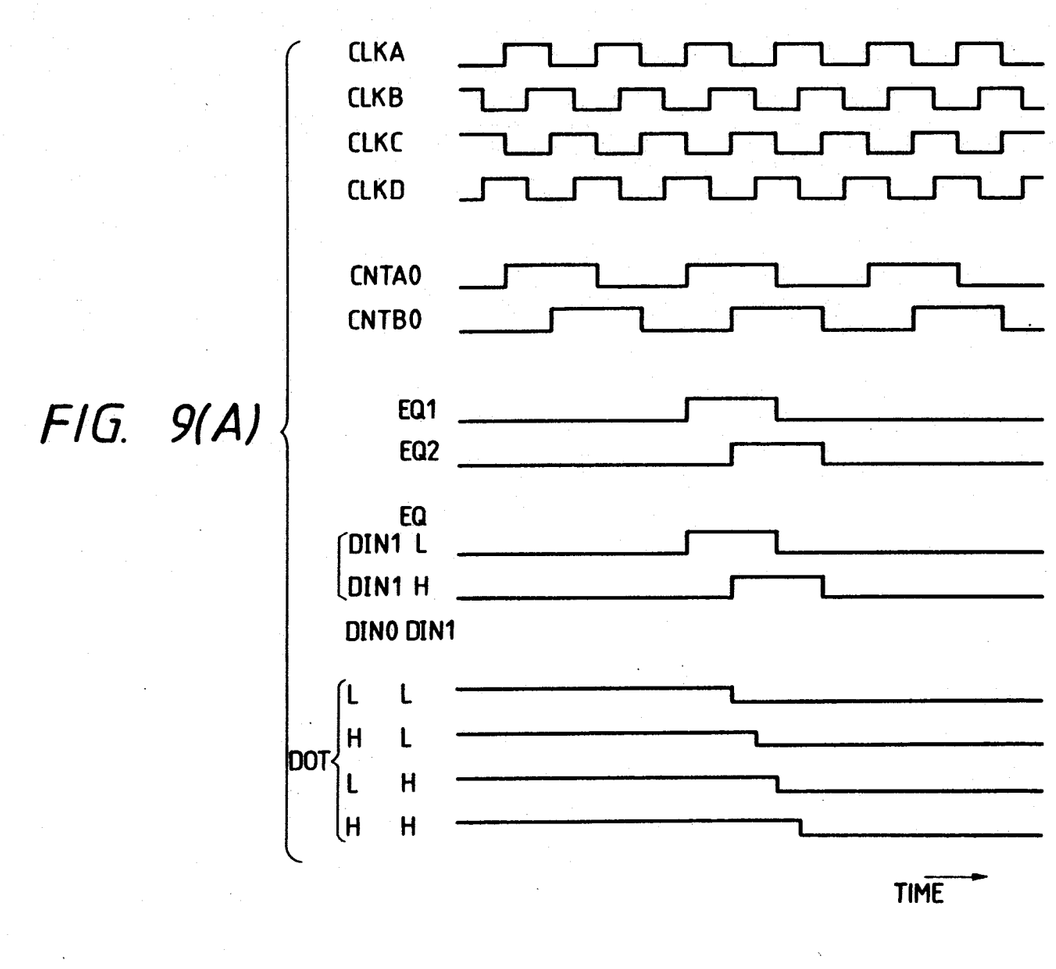
FIGS. 9(A) and 9(B) are timing diagrams showing the waveforms of various signals in the drive apparatus of FIG. 5.

As shown in FIG. 5, the pulse width modulator 100 includes a selector 120, comparators 122 and 124, a flip-flop 126, NAND gates 130, 134, and 136, and a NOT gate 132. The selector 120 receives four-phase clock signals CLKA, CLKB, CLKC, and CLKD which have a predetermined timing relation with each other as shown in FIG. 9(A). Specifically, the clock signals CLKA-CLKD are out of phase with each other by values corresponding to a half of a 1-pulse width. The clock signals CLKA-CLKD are fed from a known clock signal generator (not shown). Image data fed from a latch 5 (see FIG. 3) have eight bits DIN0-DIN8. The selector 120 receives the two lower bits DIN0 and DIN1 of the image data. The selector 120 selects one of the clock signals CLKA-CLKD in response to the two lower bits DIN0 and DIN1 of the image data, and transmits the selected clock signal Z to a T terminal of the flip-flop 126.

Figure 6:
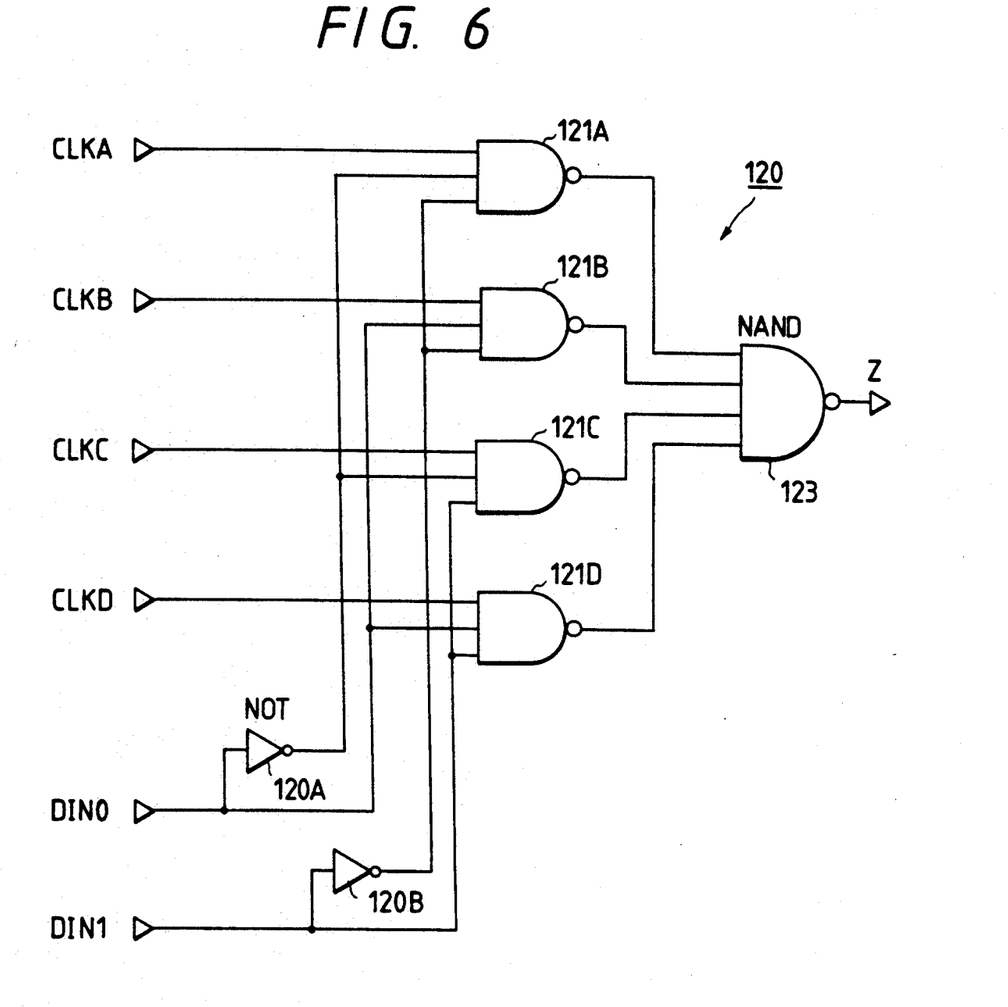
FIG. 6 is a block diagram of the clock signal selector of FIG. 5.

As shown in FIG. 6, the selector 120 includes NAND gates 121A, 121B, 121C, 121D, and 123, and NOT gates 120A and 120B. The clock signals CLKA, CLKB, CLKC, and CLKD are fed to first input terminals of the NAND gates 121A, 121B, 121C, and 121D respectively. The first lower bit DIN0 of the image data is fed to second input terminals of the NAND gates 121B and 121D. In addition, the first lower bit DIN0 of the image data is fed to the input terminal of the NOT gate 120A. The output signal from the NOT gate 120A is fed to second input terminals of the NAND gates 121A and 121C. The second lower bit DIN1 of the image data is fed to third input terminals of the NAND gates 121C and 121D. In addition, the second lower bit DIN1 of the image data is fed to the input terminal of the NOT gate 120B. The output signal from the NOT gate 120B is fed to third input terminals of the NAND gates 121A and 121B. The output signals from the NAND gates 12 121A-121D are fed to input terminals of the NAND gate 123 respectively. The NAND gate 123 outputs a signal Z which agrees with selected one of the clock signals CLKA-CLKD.

Figure 9B:
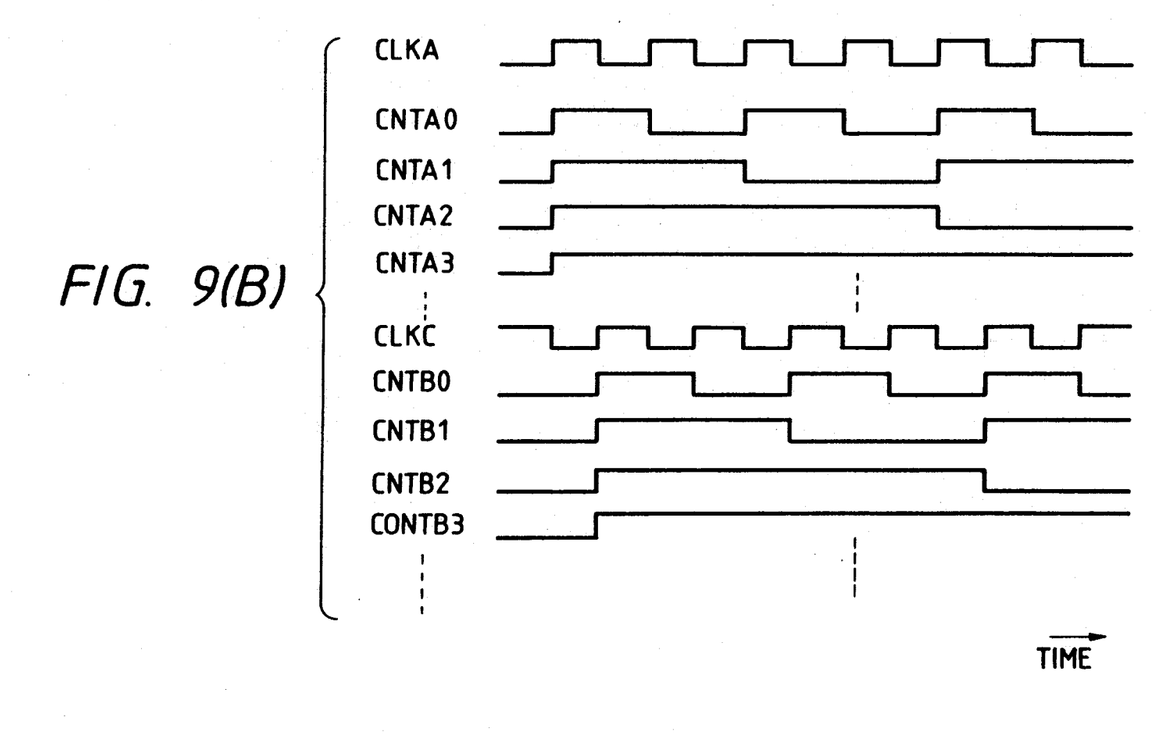

Six higher bits DIN2-DIN7 of the image data are fed to the comparators 122 and 124. A first counter signal fed from the first counter 30 has six bits CNTA0-CNTA5. As understood from FIG. 9(B), the bits CNTA0-CNTA5 of the first counter signal are generated from the clock signal CLKA by a plurality of frequency-halving processes. The bits CNTA0-CNTA5 of the first counter signal are fed to the comparator 122. The comparator 122 compares the six higher bits DIN2-DIN7 of the image data and the bits CNTA0-CNTA5 of the first counter signal. The comparator 122 outputs a high-level signal EQ1 when the six higher bits DIN2-DIN7 of the image data coincide with the bits CNTA0-CNTA5 of the first counter signal. Otherwise, the comparator 122 outputs a low-level signal EQ1. A second counter signal fed from the second counter 32 has six bits CNTB0-CNTB5. As understood from FIG. 9(B), the bits CNTB0-CNTB5 of the second counter signal are generated from the clock signal CLKC by a plurality of frequency-halving processes. The bits CNTB0-CNTB5 of the second counter signal are fed to the comparator 124. The comparator 124 compares the six higher bits DIN2-DIN7 of the image data and the bits CNTB0-CNTB5 of the second counter signal. The comparator 124 outputs a high-level signal EQ2 when the six higher bits DIN2-DIN7 of the image data coincide with the bits CNTB0-CNTB5 of the second counter signal. Otherwise, the comparator 124 outputs a low-level signal EQ2.

Figure 7:
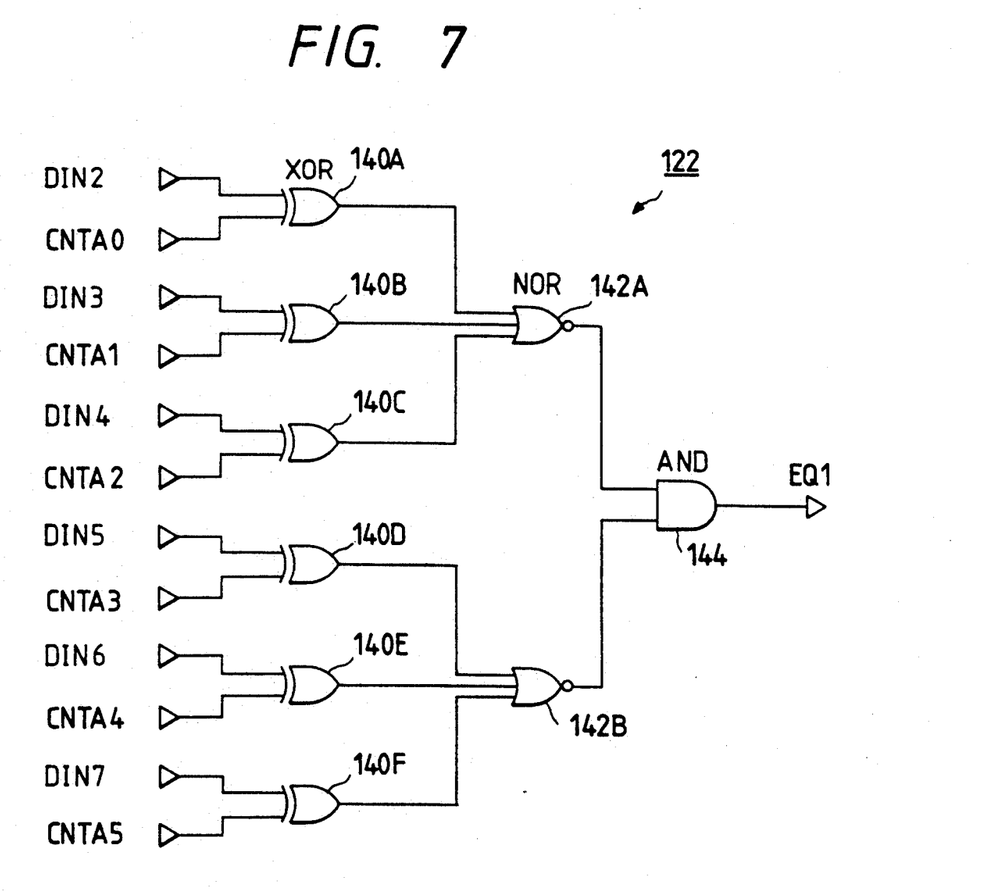
FIGS. 7 and 8 are block diagrams of the comparators of FIG. 5 respectively.

As shown in FIG. 7, the comparator 122 includes Exclusive-OR gates 140A-140F, NOR gates 142A and 142B, and an AND gate 144. The six higher bits DIN2-DIN7 of the image data are fed to first input terminals of the Exclusive-OR gates 140A-140F respectively. The bits CNTA0-CNTA5 of the first counter signal are fed to second input terminals of the Exclusive-OR gates 140A-140F respectively. The output signals from the Exclusive-OR gates 140A-140C are fed to input terminals of the NOR gate 142A respectively. The output signals from the Exclusive-OR gates 140D-140F are fed to input terminals of the NOR gate 142B respectively. The output signals from the NOR gates 142A and 142B are fed to input terminals of the AND gate 144 respectively. The AND gate 144 outputs a signal EQ1 representing whether or not the six higher bits DIN2-DIN7 of the image data coincide with the bits CNTA0-CNTA5 of the first counter signal.

Figure 8:
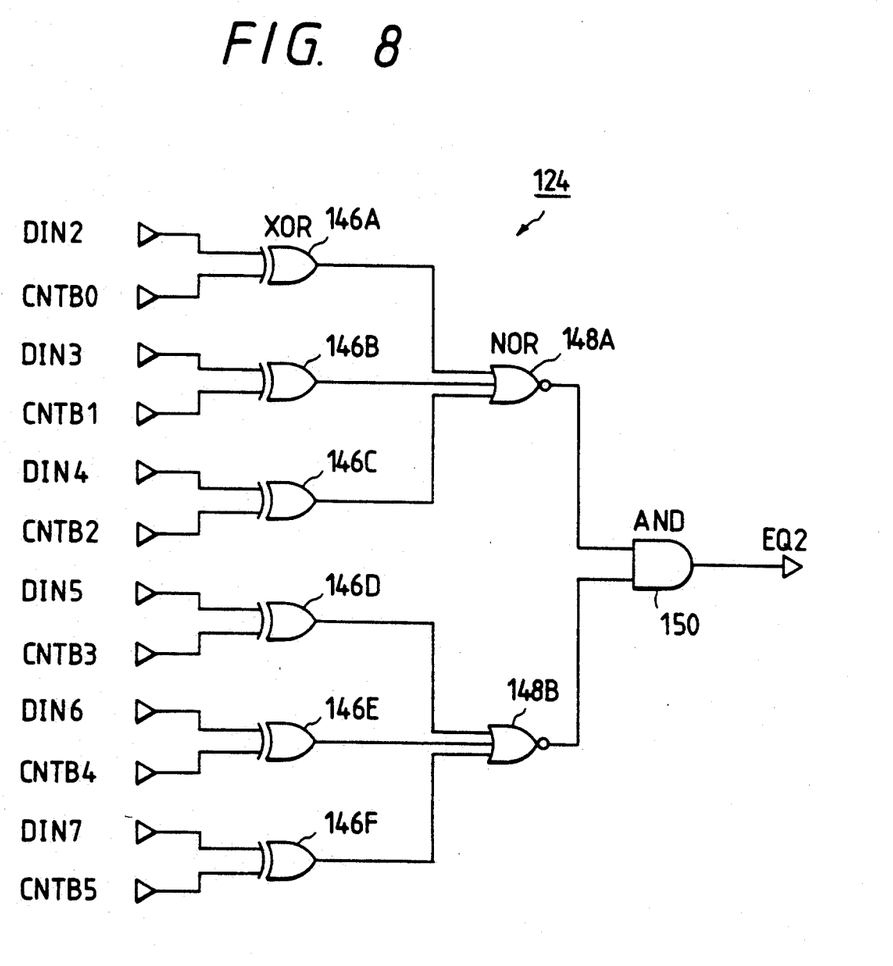

As shown in FIG. 8, the comparator 124 includes Exclusive-OR gates 146A-146F, NOR gates 148A and 148B, and an AND gate 150. The six higher bits DIN2-DIN7 of the image data are fed to first input terminals of the Exclusive-OR gates 146A-146F respectively. The bits CNTB0-CNTB5 of the second counter signal are fed to second input terminals of the Exclusive-OR gates 146A-146F respectively. The output signals from the Exclusive-OR gates 146A-146C are fed to input terminals of the NOR gate 148A respectively. The output signals from the Exclusive-OR gates 146D-146F are fed to input terminals of the NOR gate 148B respectively. The output signals from the NOR gates 148A and 148B are fed to input terminals of the AND gate 150 respectively. The AND gate 150 outputs a signal EQ2 representing whether or not the six higher bits DIN2-DIN7 of the image data coincide with the bits CNTB0-CNTB5 of the second counter signal.

As shown in FIG. 5, the output signal EQ1 from the comparator 122 is fed to a first input terminal of the NAND gate 130. The second lower bit DIN1 of the image data is fed to the input terminal of the NOT gate 132, and is inverted by the NOT gate 132. The output signal from the NOT gate 132 is fed to a second input terminal of the NAND gate 130. The second lower bit DIN1 of the image data is also fed to a first input terminal of the NAND gate 134. The output signal EQ2 from the comparator 124 is fed to a second input terminal of the NAND gate 134. The output signals from the NAND gates 130 and 134 are fed to input terminals of the NAND gate 136. The NAND gate 136 outputs a signal EQ to a J terminal and a K terminal of the flip-flop 126. A pulse signal CLR is fed to a clear terminal DR of the flip-flop 126. The pulse signal CLR has a fixed timing relation with the start of the clock signal CLKA and the counter signal bit CNTA0. Thus, the pulse signal CLR is synchronous with a horizontal scanning process. The pulse signal CLR is fed from a known pulse generator (not shown). The QB output signal from the flip-flop 126 is fed to a driver 8 (see FIG. 3).

The pulse width modulator 100 of FIG. 5 operates as follows. The selector 120 selects one of the clock signals CLKA-CLKD in response to the two lower bits DIN0 and DIN1 of the image data, and transmits the selected clock signal Z to the T terminal of the flip-flop 126. The comparator 122 compares the six higher bits DIN2-DIN7 of the image data and the bits CNTA0-CNTA5 of the first counter signal. The comparator 122 outputs a high-level identity signal EQ1 when the six higher bits DIN2-DIN7 of the image data coincide with the bits CNTA0-CNTA5 of the first counter signal. Otherwise, the comparator 122 outputs a low-level signal EQ1. The duration or width of a high-level pulse in the output signal EQ1 from the comparator 122 agrees with the pulse width of the counter signal bit CNTA0 which is the narrowest among the pulse widths of the counter signal bits CNTA0-CNTA5. Similarly, the comparator 124 compares the six higher bits DIN2-DIN7 of the image data and the bits CNTB0-CNTB5 of the second counter signal. The comparator 124 outputs a high-level identity signal EQ2 when the six higher bits DIN2-DIN7 of the image data coincide with the bits CNTB0-CNTB5 of the second counter signal. Otherwise, the comparator 124 outputs a low-level signal EQ2. The duration or width of a high-level pulse in the output signal EQ2 from the comparator 124 agrees with the pulse width of the counter signal bit CNTB0 which is the narrowest among the pulse widths of the counter signal bits CNTB0-CNTB5.

The NAND gates 130, 134, 136 and the NOT gate 132 compose a selector which selects one of the output signals EQ1 and EQ2 from the comparators 122 and 124 in response to the second lower bit DIN1 of the image data. Specifically, the output signal EQ1 from the comparator 122 is selected when the second lower bit DIN1 of the image data is in a low level state. The output signal EQ2 from the comparator 124 is selected when the second lower bit DIN1 of the image data is in a high level state. Selected one of the output signals EQ1 and EQ2 from the comparators 122 and 124 is fed to the J terminal and the K terminal of the flip-flop 126 as an identity signal EQ. Only during a period where the identity signal EQ remains in a high level state, the output signal DOT from the pulse width modulator 100 is reversed in response to the clock signal fed to the T terminal of the flip-flop 126. During other periods, the transition of the output signal DOT from the pulse width modulator 100 is inhibited. The timing of the transition of the output signal DOT is determined by one of the clock signals CLKA-CLKD which is selected by the selector 120. Therefore, as shown in FIG. 9(A), the pulse width of the output signal DOT can be determined by four timings selected in response to the two lower bits DIN0 and DIN1 of the image data. The pulse signal CLR is fed to the clear terminal of the flip-flop 126 so as to control a timing of the start of a pulse of the output signal DOT. Specifically, each pulse of the output signal DOT starts at a constant timing which agrees with the moment of the start of pulses of the clock signal CLKA and the counter signal bit CNTA0.

As understood from the comparison between the output signal DOT and the clock signals CLKA-CLKD in FIG. 9(A), it is possible to execute advanced pulse width modulation similar to pulse width modulation which is realized in the case of quadrupling the frequency of a clock signal. Thus, the advanced pulse width modulation can accurately respond to image data of a quadrupled frequency for equal operation speeds.

What is claimed is:

1. A drive apparatus for an optical element array, comprising:

first and second counters counting clock pulses and being periodically reset at a horizontal scanning period, the first counter and the second counter outputting a first counter signal and a second counter signal respectively, the first counter signal and the second counter signal being out of phase with each other;

means for latching a pixel-corresponding segment of an input image signal;

means for selecting one of clock signals out of phase with each other in response to the pixel-corresponding input-signal segment latched by the latching means;

a first comparator comparing the first counter signal and the pixel-corresponding input-signal segment latched by the latching means, and outputting a first identity signal when the first counter signal and the pixel-corresponding input-signal segment are equal to each other;

a second comparator comparing the second counter signal and the pixel-corresponding input-signal segment latched by the latching means, and outputting a second identity signal when the second counter signal and the pixel-corresponding input-signal segment are equal to each other;

means for generating a pulse which starts in synchronism with a start of a horizontal scanning period and which ends in response to the clock signal selected by the clock selecting means and in response to the first and second identity signals; and means for driving an optical element in the array in response to the pulse generated by the pulse generating means.

2. A drive apparatus for an optical element array, comprising:

first and second counters counting clock pulses and being periodically reset at a horizontal scanning period, the first counter and the second counter outputting a first counter signal and a second counter signal respectively, the first counter signal and the second counter signal being out of phase with each other;

means for latching a pixel-corresponding segment of an input image signal;

first selecting means for selecting one of clock signals out of phase with each other in response to predetermined lower bits of the pixel-corresponding input-signal segment latched by the latching means;

a first comparator comparing the first counter signal and predetermined higher bits of the pixel-corresponding input-signal segment latched by the latching means, and outputting a first identity signal when the first counter signal and the higher bits of the pixel-corresponding input-signal segment are equal to each other;

a second comparator comparing the second counter signal and the higher bits of the pixel-corresponding input-signal segment latched by the latching means, and outputting a second identity signal when the second counter signal and the higher bits of the pixel-corresponding input-signal segment are equal to each other;

second selecting means for selecting one of the first and second identity signals in response to a highest bit of the lower bits of the pixel-corresponding input-signal segment;

means for generating a pulse which starts in synchronism with a start of a horizontal scanning period and which ends in response to the clock signal selected by the first selecting means and in response to the identify signal selected by the second selecting means; and means for driving an optical element in the array in response to the pulse generated by the pulse generating means.

* * * * *